United States Patent [19]

Cook et al.

[11] Patent Number: 4,975,203

[45] Date of Patent: Dec. 4, 1990

[54] SODIUM BOROHYDRIDE/SODIUM ALUMINATE

[75] Inventors: Michael M. Cook, Danvers; Jeffrey A. Ulman, Beverly, both of Mass.

[73] Assignee: Morton International, Inc., Chicago, Ill.

[21] Appl. No.: 360,834

[22] Filed: Jun. 2, 1989

[51] Int. Cl.$^5$ .............................................. C02F 1/62
[52] U.S. Cl. .................................. 210/716; 210/719; 210/724; 210/912; 252/188.26; 252/315.7; 252/175
[58] Field of Search ............... 210/720, 912, 913, 914, 210/719, 757, 724, 716, 717; 252/188.26, 315.7, 175; 423/286, 600

[56] References Cited

U.S. PATENT DOCUMENTS

| | | | |
|---|---|---|---|
| 2,970,114 | 1/1961 | Bragdon | 423/286 |
| 3,770,423 | 11/1973 | Lores et al. | 210/719 |
| 4,092,154 | 5/1978 | Dietz, Jr. et al. | 252/188.26 |
| 4,755,328 | 7/1988 | Mouton et al. | 210/724 |

*Primary Examiner*—Peter Hruskoci
*Assistant Examiner*—Krisanne Shideler
*Attorney, Agent, or Firm*—Wayne E. Nacker; Gerald K. White

[57] ABSTRACT

An aqueous solution for removing metals from waste water contains sodium borohydride, sodium aluminate and sodium hydroxide.

8 Claims, No Drawings

SODIUM BOROHYDRIDE/SODIUM ALUMINATE

BACKGROUND OF THE INVENTION

This invention relates to the preparation of novel, aqueous solutions of sodium borohydride ($NaBH_4$) and sodium aluminate ($Na_2Al_2O_4$), and their use in treating metal-bearing wastes. The sodium borohydride removes the dissolved complexed metal ion as a reduced precipitate, while the sodium aluminate serves to coagulate the insoluble particles. (To be useful as commercial products these solutions need sufficient level(s) of alkaline agent(s) to retard the rate of borohydride hydrolysis and thereby minimize the pressure build-up due to the formation of hydrogen.)

PRIOR ART - SOLUTION

Because of the need to maintain a high level of alkaline agent(s) (i.e. NaOH or $Na_2O$) in solutions of sodium borohydride (for hydrolytic stability of the borohydride ion); because of the commercial requirements of a high level of sodium borohydride in a solution; and because the common manufacturing process for sodium borohydride produces 3.0-3.5 moles of NaOH per mole of $NaBH_4$; solutions containing only sodium borohydride and $\geq 25\%$ sodium hydroxide are presently commercially available. Only few other solutions with additional components have been reported. U.S. Pat. No. 3,933,676 teaches the preparation of sodium borohydride, sodium hydroxide and sodium zincate by dissolving low levels of zinc oxide (ZnO) in SWS TM solution (12% $NaBH_4$, 40% NaOH) (see also U.S. Pat. No. 2,970,114). Even this preparation requires extended agitation at elevated temperatures.

PRIOR ART - APPLICATION

The use of alum [$Al_2(SO_4)_3$ $18H_2O$] in wastewater treatment has a long history. It has been one of the most generally effective coagulants known (see for example Kirk Othmer, 3rd Ed., Vol. 2, p. 244ff and Vol. 24 p. 295ff). When used in sequential combination with sodium borohydride, alum, in most cases, forms a pin floc with the reduced metal particles. Subsequent addition of an anionic polymer agglomerates these particles, thereby aiding solid/liquid separation. Typically, alum is added prior to introduction of $NaBH_4$. When dissolved in water, the $Al^{3+}$ ions in alum form an aluminum hydroxide whose exact composition depends on several factors including pH.

SUMMARY OF THE INVENTION

In accordance with the invention there is provided a novel solution of sodium borohydride, sodium aluminate and sufficient caustic to stabilize the sodium borohydride against premature hydrolysis. This solution is added to metal-containing waste water to precipitate and coagulate the metal.

DETAILED DESCRIPTION OF CERTAIN PREFERRED EMBODIMENTS

A novel solution is provided for removal and/or recovery of metal from waste water. The solution is of $NaBH_4$, $Na_2Al_2O_4$ and sufficient caustic to stabilize the $NaBH_4$ against premature hydrolysis. The sodium borohydride acts to reduce metal ions to their metallic state. The aluminum ion provided by the aluminate acts to coagulate the reduced metal particles. Hydroxyl ion acts to stabilize borohydride against premature hydrolysis.

Throughout this application, the invention is described in terms of a solution of sodium borohydride, sodium aluminate and sodium hydroxide. Broadly, the monovalent cation in any of these compounds could be any alkali-metal cation, e.g., $Li^+$, $K^+$; however, from an economic standpoint, sodium is the cation of choice in each case.

Terms "metal-containing" water and "metal" removable therefrom herein refers to an ion of any metal that is reducible by sodium borohydride to produce a particulate species which comes out of solution. Such metals are found throughout the transition metals, the lanthanide series the actinide series and metals in Groups IIIA-VIA of atomic number 31 or higher. Generally, such metals coincide with the definition of "Heavy Metals" found in *Concise Chemical and Technical Dictionary*, H. Bennett ed. 1947 Chemical Publishing Co., Inc., Brooklyn, N.Y.: "*Heavy metals*. metals which can be precipitated by hydrogen sulfide in acid solution, e.g., lead, silver, gold, mercury, bismuth, and copper."

The amounts of sodium borohydride and sodium aluminate may vary over wide ranges both with respect to total amount of each in solution and in amounts relative to each other. For efficiencies of shipment and storage, solutions of sodium borohydride and sodium aluminate generally contain at least about 1 weight percent of each and preferably at least about 2.5 wt percent of each. The amounts of sodium borohydride and sodium aluminate will depend upon the particular application. Sufficient sodium borohydride must be provided to reduce the metal and sufficient sodium aluminate must be provided to coagulate particulates of the reduced metal. The aluminum ion acts to coagulate the metal particulates by neutralizing surface charge of reduced metal particulates, thereby allowing the particulates to aggregate. The metal particulates which form by the reduction process have a negative zeta potential, and the aluminum ion neutralizes this zeta potential. It is necessary that the particulates which form by reduction coagulate because the reduced metal particulates are generally too small to settle at an appreciable rate. Generally, the weight ratio of sodium borohydride and sodium aluminate varies between about 10:1 and about 1:10 and more commonly between about 2:1 and about 1:2.

The sodium hydroxide is present primarily for the purpose of reducing hydrolysis of sodium borohydride, thereby reducing hydrogen evolution. For shipping and storage in a sealed container, it is considered that sodium hydroxide should comprise at least about 30 wt. percent of the solution. 20 wt. percent sodium hydroxide is considered sufficient if the solution is shipped in a vented container. On the other hand, if the solution is made up on site and used immediately before substantial hydrolysis of sodium borohydride can occur, the sodium hydroxide may comprise as little as 0.4 wt percent of the solution.

Efficiencies of shipping and storage are, of course, achieved if the solution is as concentrated as possible, and total solids may reach up to about 55 wt. percent.

The total volume of solution added to waste water will depend upon a variety of factors, such as concentration of the compounds in the solution and concentration and type of metal(s) in the waste water. So as not to significantly add to the volume of the waste stream, the solution is generally added at less than 1% by volume relative to the volume of the waste water and generally significantly less than this volume. On the other hand, some meaningful volume for efficient mixing and accurate metering may be required, and a potential user may dilute a concentrated solution just prior to adding it to the waste water in order to provide a volume consistent with good mixing and accurate metering.

Generally, the solution is used in an amount sufficient to provide at least about two to four times the amount of sodium borohydride required to reduce the waste metal in the waste water. Reduction of the metal(s) may be either directly by the sodium borohydride or indirectly through an intermediate reducing species e.g., reduction $S_2O_4^=$ or $BH_3OH^-$. The aluminum ion coagulates the metal particulates which form, producing aggregates of sufficient size to precipitate from the waste water. In some cases an anionic polymeric flocculent is added to hasten gravity settling.

pH adjustment may be desirable to maximize rate of sodium borohydride reduction of metal ions. For systems in which the primary metal ion is copper, a pH range of 4–8 and preferably 4.5–6 is desirable, particularly if reduction is indirect. For systems in which the metal ion is primarily reduced directly by sodium borohydride, the pH may be as high as 9 to 11. The solution, of course, is highly alkaline. To achieve proper pH in the reduction/coagulation zone, the pH of the waste water may be appropriately adjusted downward prior to addition of the solution or direct pH control may be maintained within the metal recovery zone itself.

The metal-containing precipitate, which results from treatment with the solution, is separated from the waste water by conventional means, such as filtration or decantation. Typically the precipitate is pressed to remove water, thereby producing a pressed filter cake. This material may be smeltered to recover the metal ion, redissolved to provide a source of the recovered metal for various chemical processes or appropriately disposed of.

Surprisingly we have found that stable aqueous solutions of sodium borohydride and sodium aluminate can be readily prepared by simple ambient temperature blending SWS solution, sodium aluminate and, if warranted, sodium hydroxide solutions, all of which are commercially available products.

From a commercial stability standpoint with respect to pressure build-up (due to formation of hydrogen by hydrolysis of borohydride) and secondarily, with respect to minimizing the loss of borohydride, $\geq 20\%$ NaOH (15.5% $Na_2O$) is required for commercial shipment in vented or pressurized tanks. For commercial shipment/warehouse storage of closed (i.e. nonvented) 55 gal (208 L) containers, levels of $\geq 30\%$ NaOH (23.2% $Na_2O$) are desirable in the final formulation. It is also desirable to have the maximum levels of sodium borohydride and sodium aluminate to minimize transportation and storage costs. However, the product should be stable toward crystalization at approximately $\geq 13°$ C. (55° F.) to minimize the need for heated storage/transit facilities.

The desired ratio of sodium aluminate/sodium borohydride is dictated by the intended application for these blended products.

Sodium aluminate solutions are available as either 45 and 38% total solid solutions. Due to economic considerations, the 45% solids (19.5% $Na_2O$, 25.5% $Al_2O_3$ or 40% $Na_2Al_2O_4$, 5% $Na_2O$) solution was used in our preparations.

This invention also involves the use of such aqueous solutions containing both sodium borohydride and $Al^{3+}$ ions as sodium aluminate ($Na_2Al_2O_4$). Several advantages of using these solutions over separate additions of $Al^{3+}$ and $NaBH_4$ have been identified: (1) One less processing step is required; (2) a reduced quantity of aluminium ion is needed to achieve equivalent solid/liquid separation, resulting in reduced sludge generation; and (3) in many cases, less sodium borohydride is needed due to improved particle formation, resulting in less reoxidation and improved economics.

The application of these solutions involves minimal, if any, changes from the processes employing VenMet$^R$ ($NaBH_4$) solutions. The initial pH of the wastewater should be the same as or slightly lower than that used with VenMet solution. The preferred compositions of these solutions contain a higher ratio of $NaOH:NaBH_4$ than that found in VenMet. As a result, addition of these solutions can cause the pH of the wastewater to rise above the optimal value in some cases, unless a lower initial pH or increased acid feed rates are used. These $NaBH_4/Na_2Al_2O_4$ solutions are added at the same point in the continuous treatment scheme as VenMet solution. The prior addition of alum is eliminated. Residence time for the reduction is unchanged. Reaction control via oxidation-reduction potential (ORP) is used, with the setpoint being the same as that used with $NaBH_4$ solution. After reduction is complete, the wastewater flows to a tank where an anionic polymer is added. Addition of a cationic polymer before the anionic polymer may be warranted (i.e. there may be some systems where a cationic polymer improves solid/liquid separation). The treated wastewater next typically flows to a clarifier. Overflow from the clarifier feeds to a filter, and the effluent is then discharged. Solids from the bottom of the clarifier are fed to a filter press. It is in the operation of the clarifier and filter press that the reduced sludge volumes generated compared with conventional alum/VenMet solution treatment can be seen.

The following is a preferred listing of processing steps for treatment of metal-bearing wastes using the products of this invention. It is understood that the exact steps will vary depending on the nature of the waste and the equipment being used in the treatment system.

(1) Feed the wastewater to an equalization tank if available.

(2) Allow the wastewater to flow to the first reaction tank, where an aqueous sodium bisulfite solution is added and pH is adjusted, preferably to the 4–5 range.

(3) Either in the same tank or in a second reaction tank, the sodium borohydride/sodium aluminate solution is fed in under ORP control. The usual setpoint is in the −550 to −500 mV range. The pH should be monitored and acid added if necessary to maintain the pH at a maximum of 5.5–6.0.

(4) After a 15–30 minute residence time in the reaction tank, the wastewater flows to a tank where an anionic polymeric flocculant is added. Slow mixing is continued for 10–15 minutes to build-up particle size.

(5) The treated waste next flows to a clarifier decant from the clarifier is passed through a filter and is then discharged. Solids at the bottom of the clarifier are fed to a filter press, where they are dewatered.

PRODUCT COMPOSITION

A large variety of these product compositions can be prepared having $\geq 30\%$ NaOH. Typical preferred compositions as shown in Table 1 have been prepared.

TABLE 1

| | Blend Number | | | | |
|---|---|---|---|---|---|
| | 1 | 2 | 3 | 4 | 5 |
| % $NaBH_4$ | 3.9 | 5.0 | 3.9 | 5.0 | 6.0 |
| % $Na_2Al_2O_4$ | 3.6 | 4.6 | 7.1 | 9.1 | 2.7 |
| % NaOH | 30.0 | 30.3 | 30.0 | 30.0 | 30.0 |

(note that $Na_2Al_2O_4$ can be considered $Na_2O + Al_2O_3$, however, since this alkali is, in this case, bound to aluminum oxide, this alkali will not likely enhance the hydrolytic stability of borohydride).

COMPOSITION RANGES

For commercial purposes any solution with $\geq 20\%$ NaOH (not associated as $Na_2Al_2O_4$) could be useful, if appropriate/safe venting or pressurized containment is provided during shipment/storage. If 20% NaOH is taken as a minimum, a maximum addition total solubility of $\leq 35\%$ is likely for sodium borohydride and sodium aluminate (i.e. the sum of % $NaBH_4$ + % $Na_2Al_2O_4 \leq 35\%$). This range could be extended to lower sodium hydroxide levels but this risk "significant" borohydride hydrolysis losses that would likely occur between manufacture and use. However, any composition with the total solids (i.e. the sum of % NaOH, % NaBH plus % $Na_2Al_2O_4$ is $\leq 55\%$) could be prepared on site from the respective components and used efficiently in a suitable time frame.

EXAMPLES (1) A continuous treatment system at a printed circuit board manufacturer was operating at 50 gallons (190 L) per minute with an average copper loading of 22 mg $Cu^{2+}/L$. Their standard process included the following steps: (1) Adjust $Na_2S_2O_5$ pH range to 4–5; (2) Add sodium bisulfite at a 200 mg $Na_2S_2O_5$/L dosage; (3) Add 200 mg alum/L; (4) Set ORP controller to a −600 mV endpoint and meter in VenMet solution; (5) Add 1–2 mg of an anionic flocculant/L; (6) Allow to settle in clarifier, filter the decant, then discharge. This system was adapted to employ a sodium borohydride/sodium aluminate solution with only minimal changes: the pH was adjusted to the 3–4 range rather than 4–5, a controller maintained the pH at a maximum of 6.0 during the reaction, step (3) was eliminated and the new product was substituted for VenMet solution in step (4). Using the sodium borohydride/sodium aluminate solution, acceptable copper levels in the discharge were achieved using equivalent contained those obtained with VenMet solution. Also, good solid/liquid separation was attained using a greatly reduced quantity of $Al^{3+}$ compared with the 200 mg alum/L normally used. As a result, sludge generation was reduced by 60-70%.

(2) A printed circuit board wastewater was treated with either sodium bisulfite and $NaBH_4$ or sodium bisulfite and $NaBH_4/Na_2Al_2O_4$ solution at a pH between 4 and 5. The initial copper concentration was 38 mg $Cu^{2+}/L$. Chemical dosages were optimized to produce an effluent having below 1 mg Cu/L. When no coagulants were used, the reduced particles were extremely fine and unfilterable. Several different coagulant systems were evaluated and compared; alum/$NaBH_4$/anionic polymer; alum/$NaBH_4$/cationic polymer/anionic polymer; cationic polymer/anionic polymer; $NaBH_4$-$Na_2Al_2O_4$ solution/anionic polymer; and $NaBH_4$-$Na_2Al_2O_4$ solution/cationic polymer/anionic polymer. The $NaBH_4$-$Na_2Al_2O_4$ solution produced more complete solid/liquid separation than separate additions of alum and $NaBH_4$ at equivalent contained $Al^{3+}$ levels, when no cationic polymers were added. Additions of specific cationic polymers produced excellent solid/liquid separation in all cases. However, reduced quantities of cationic polymers were required with the $NaBH_4$-$Na_2Al_2O_4$ solutions compared with separate additions of alum and $NaBH_4$.

(3) A wastewater from another manufacturer, containing 14 mg Cu/L, was treated with either sodium bisulfite and $NaBH_4$ or sodium bisulfite and $NaBH_4$-/$Na_2Al_2O_4$ solution. This wastewater was treated more easily than the one in Example 2, i.e. less $NaBH_4$ was required to reduce copper levels below 1 mg Cu/L. As a result, the quantity of $Al^{3+}$ contained in the amount of $NaBH_4/Na_2Al_2O_4$ solution used was lower than than used in the previous example. Yet, this amount of the solution, which contained $Al^{3+}$ equivalent to 20 mg alum/L, produced better solid/liquid separation than separate additions of 50 mg alum/L and $NaBH_4$. With separate additions, further addition of a cationic polymer was necessary for acceptable solid/liquid separation.

While the invention has been described in respect to certain preferred embodiments, modifications obvious to one with ordinary skill in the art may be made without departing from the scope of the present invention.

Various features of the invention are set forth in the following claims.

What is claimed:

1. An aqueous solution comprising at least about 1 wt. percent $NaBH_4$, 1 wt. percent $Na_2Al_2O_4$ and at least about 20 wt. percent NaOH, said $NaBH_4$ and $Na_2Al_2O_4$ being provided at a weight ratio of between about 2:1 and about 1:2.

2. An aqueous solution according to claim 1 containing at least about 2.5 wt. percent $NaBH_4$ and at least about 2.5 wt. percent $Na_2Al_2O_4$.

3. An aqueous solution according to claim 2 containing at least about 30 wt. percent NaOH.

4. An aqueous solution according to claim 1 containing at least about 30 wt. percent NaOH.

5. A method of removing metals from waste water, which metals are reducible by sodium borohydride to produce particulate species and which metals are selected from the transition metals, the lanthanide series, the actinide series and metals of Groups IIIA–VIA of atomic number 31 or higher, comprising:

preparing a solution comprising at least about 1 wt. percent $NaBH_4$, 1 wt. percent $Na_2Al_2O_4$ and at least about 20 wt. percent NaOH, said $NaBH_4$ and $Na_2Al_2O_4$ being provided at a weight ratio of between about 2:1 and about 1:2, and adding sufficient amount of said solution to the waste water to provide sufficient $NaBH_4$ to reduce metal from the waste water and sufficient $Na_2Al_2O_4$ to coagulate reduced metal particulates, and removing said metal particulates.

6. A method according to claim 5 wherein said solution contains at least about 2.5 wt. percent $NaBH_4$ and at least about 2.5 wt. percent $Na_2Al_2O_4$.

7. A method according to claim 6 wherein said solution contains at least about 30 wt. percent NaOH.

8. A method according to claim 5 wherein said solution contains at least about 30 wt. percent NaOH.

* * * * *